United States Patent
Oikarinen

(10) Patent No.: US 11,005,286 B2
(45) Date of Patent: May 11, 2021

(54) METHOD AND ARRANGEMENT FOR ACTUATING POWER PACK

(71) Applicant: Normet Oy, Iisalmi (FI)

(72) Inventor: Timo Oikarinen, Kajaani (FI)

(73) Assignee: Normet OY, Iisalmi (FI)

( * ) Notice: Subject to any disclaimer, the term of this patent is extended or adjusted under 35 U.S.C. 154(b) by 0 days.

(21) Appl. No.: 16/463,280

(22) PCT Filed: Nov. 23, 2017

(86) PCT No.: PCT/FI2017/050818
§ 371 (c)(1),
(2) Date: May 22, 2019

(87) PCT Pub. No.: WO2018/096218
PCT Pub. Date: May 31, 2018

(65) Prior Publication Data
US 2019/0267832 A1    Aug. 29, 2019

(30) Foreign Application Priority Data

Nov. 24, 2016   (FI) ...................................... 20165891

(51) Int. Cl.
*H02J 7/14* (2006.01)
*H02J 3/30* (2006.01)
*H02J 3/32* (2006.01)
*H02P 1/58* (2006.01)
*H02P 4/00* (2006.01)
(Continued)

(52) U.S. Cl.
CPC .............. *H02J 7/1415* (2013.01); *H02J 3/30* (2013.01); *H02J 3/32* (2013.01); *H02K 51/00* (2013.01);
(Continued)

(58) Field of Classification Search
CPC .. H02J 7/1415; H02J 3/30; H02J 7/345; H02J 3/32
(Continued)

(56) References Cited

U.S. PATENT DOCUMENTS 5,293,947 A * 3/1994 Stratton ................... B60K 6/46
180/2.1
6,441,581 B1 * 8/2002 King ....................... H02K 7/025
320/101
(Continued)

FOREIGN PATENT DOCUMENTS

| EP | 2857253 A1 | 4/2015 |
| JP | 2001304001 A | 10/2001 |
| WO | 2005101610 A2 | 10/2005 |

OTHER PUBLICATIONS

International Search Report and Written Opinion issued for International Application PCT/FI2017/050818 dated Feb. 20, 2018.
(Continued)

*Primary Examiner* — Alfonso Perez Borroto
(74) *Attorney, Agent, or Firm* — Thomas|Horstemeyer, LLP

(57) ABSTRACT

A dual actuated power pack (300) comprises a battery (104) and first (101) and second (102) electric motors, as well as a power generator (103). The first electric motor (101) is powered by the battery (104) and the second electric motor (102) by a grid (106). The first and second electric motors (101, 102) are mechanically coupled (108) with each other so that when said second electric motor (102) is powered, said second electric motor (102) actuates (109) said power generator (103) and said first electric motor (101) at the same time, whereupon the first electric motor (101) functions as a hi-power battery charger and recharge the battery (104) when said second electric motor (102) actuates (109) the power generator (103). When the second electric motor is not used, the first electric motor (101) is powered (104, 105), and the power generator (103) is actuated (108) by said first electric motor (101).

16 Claims, 2 Drawing Sheets

(51) Int. Cl.
*H02P 5/747* (2006.01)
*H02P 9/00* (2006.01)
*H02P 1/54* (2006.01)
*H02P 5/00* (2016.01)
*H02K 51/00* (2006.01)
*H02J 7/34* (2006.01)

(52) U.S. Cl.
CPC .................. *H02P 1/54* (2013.01); *H02P 1/58* (2013.01); *H02P 4/00* (2013.01); *H02P 5/00* (2013.01); *H02P 5/747* (2013.01); *H02P 9/00* (2013.01); *H02J 7/345* (2013.01)

(58) Field of Classification Search
USPC .......................................................... 307/20
See application file for complete search history.

(56) References Cited

U.S. PATENT DOCUMENTS 8,994,215 B1    3/2015  Davis
2009/0134851 A1*  5/2009  Takeda ................... H02M 3/07
                                                    323/234
2013/0146411 A1*  6/2013  Hendrickson .......... B60L 50/61
                                                    191/33 R
2014/0265695 A1   9/2014  Thompson
2014/0365052 A1  12/2014  Kouhia et al.
2015/0171774 A1   6/2015  Kim et al.
2015/0275750 A1  10/2015  Algrain
2016/0226254 A1*  8/2016  Cheng .................... H02J 3/382

OTHER PUBLICATIONS

Search Report issued for Finnish Patent Application 20165891 dated Jun. 1, 2017.
Office Action issued for Finnish Patent Application 20165891 dated Dec. 21, 2018.
Supplementary European Search Report for EP17873696 dated Apr. 30, 2020.

* cited by examiner

METHOD AND ARRANGEMENT FOR ACTUATING POWER PACK

CROSS-REFERENCE TO RELATED APPLICATIONS

This application is the 35 U.S.C. § 371 national stage application of PCT Application No. PCT/FI2017/050818, filed Nov. 23, 2017, where the PCT claims the priority to and benefit of Finnish Patent Application No. 20165891, filed Nov. 24, 2016, both of which are herein incorporated by reference in their entireties.

TECHNICAL FIELD OF THE INVENTION

The invention relates to a method and arrangement for actuating a power pack, such as a hydraulic power pack. In particularly the invention relates to a method and arrangement for actuating a power pack by at least two different types of actuating methods for example for different environmental conditions.

BACKGROUND OF THE INVENTION

Power generators, such as hydraulic pumps or compressors are typically powered by electric motors. Depending on an environment the electric motors are grid powered or combustion engine powered, but also battery powered electric motors are used for powering the generators. The battery powered electric motor is commonly used for situations where the combustion engine cannot be used, such as in mining or tunnelling sites or other sites having essentially closed environment, or when there are no external electric grids in use. The battery powered electric motors are also often used on non-road mobile machinery, that can't be connected to the grid during operation. This may be e.g. due to the lack of the grid or due to the mobility of the machinery.

U.S. Pat. No. 8,994,215 relates to a self-recharging electric generator system in communication with an external system and that includes a battery unit configured to supply to the self-charging electric generator system, an automatic switching unit configured to switch between a main power supply source and the self-recharging electric generator system, at least one electric motor configured to receive power from the battery unit, and at least one generator configured to produce power to be supplied to the external system when a failure occurs at the main power supply source, where the power produced by the at least one generator is further supplied to the automatic switching unit for performing continuous recharging of the self-recharging electric generator system.

There are however some disadvantages relating to the known prior art, especially in the closed environment and with weak current conditions, like especially in mining and tunnelling sites. The grid powered electric motor used for powering the generator induces typically a load peak especially in starting (currents are much more higher during starting that during normal operation with nominal speed), which should be taken into account by using massive or even oversized grid power feedings and power lines, as well as suitable interference filters. This is naturally very demanding and expensive especially in difficult environments, such as temporary mining or tunnelling constructions. In addition the using of the battery powered motor might induce interference to the other portions of the power grid systems, as well as sparks, which are at least noising but might also be very dangerous in the closed environment. Thus different kinds of filters are used in prior art systems, which make the systems massive, more vulnerable and expensive.

SUMMARY OF THE INVENTION

An object of the invention is to alleviate and eliminate the problems relating to the known prior art. Especially the object of the invention is to provide a method and arrangement for dual actuating a power pack so that the operation would be cost effective, safe, light and interference free and so that any massive interference filters could be avoided. In addition the object of the invention is to minimize the need of massive or even oversized grid power feedings, components or power lines and also make it possible to keep the grid load essentially constant.

The object of the invention can be achieved by the features of independent claims.

The invention relates to a dual actuated power pack according to claim 1. In addition the invention relates to a method for the dual actuated power pack according to claim 11.

According to an embodiment of the invention the dual actuated power pack comprises an energy storage, first and second electric motors and a power generator, where the power generator is actuated by the first and second electric motors. The first electric motor is advantageously powered by the energy storage and the second electric motor is advantageously powered externally, such as by an electric grid, mains current or by a combustion engine power, for example. In addition the first and second electric motors are mechanically coupled with each other so that when the second electric motor is powered, the second electric motor actuates the power generator and also the first electric motor, whereupon the first electric motor functions as a charger or loader and recharges or reloads the energy storage. However, when the first electric motor is powered, it actuates the power generator.

When the first and second electric motors are mechanically coupled with each other, a pure galvanic isolation can be achieved and thus also interference free operation without any massive interference filters, which is clear advantage of the invention. In addition also monitoring of the whole system can be implemented easily and should there occur any malfunctions or other harmful or unwanted effects the electrically separated electric motors can be easily switch off or separate from the grid or other portions of the system, for example, and thereby minimizing and even eliminating any interferences. Moreover, when the second electric motor is used as the actuator of the power generator, the first electric motor can be used as a generator, such as an electric generator for charging for example a battery as said energy storage. When used as the charger or loader, especially as said electric charger, the power of the first motor is enormous, because it is however designed as a power source for actuating the power generator. Further it is to be noted that it is additionally galvanically separated from the external power grid and the second electric motor and thus any interferences possibly induced by the first electric motor or during charging can be effectively avoided without any electrical filters or arrangements.

The energy storage is advantageously the battery, but it can also be implemented by other ways, such as by rechargeable energy or electric storage, a fuel cell, supercapacitor or flywheel or combination thereof. Naturally, depending on the type of the energy storage the first electric motor as the charger or loader should be adjusted in a corresponding manner, such as charging supercapacitor or loading kinetic or other mechanical energy to the flywheel.

In addition, according to an embodiment of the invention the first electric motor can be used also for soft-starting the second electric motor in situations where the second electric motor is used as a main source for actuating the power generator. The soft-starting can be implemented e.g. by spinning the first electric motor to or near synchronous grid speed before connecting the second electric motor to the grid. In addition, according to an embodiment possible power peaks can be moderated by using the first electric motor. Also additional power needed for the power generator for example temporary by some reason can be provided by using the first electric motor as an additional power source over the main use of the second electric motor.

By the above mentioned embodiment load peaks especially in starting, but also due to unexpected load peaks to the generator, can be minimized or even eliminated which is very important and advantage feature, namely e.g. during the starting the electric currents needed might be multiple times greater compared to the normal operation with nominal speed. Thus the grid power feedings and power lines can be designed essentially for the nominal speed and normal operation conditions and no oversized designs are needed.

The present invention offers advantages over the known prior art, as is already discloses above in connection with the embodiment of the invention. In addition the embodiments of the invention allow manufacturing of compact size systems in a cost effective manner, because no expensive and massive components, like interference filters, are needed anymore due to the galvanic separation. The invention also allows using of different main voltages and easy way to design second electric motor for different main voltages. Moreover and especially the invention offers huge load capacity of the energy storage, such as using the first electric motor as a hi-power battery charger. The invention also offers true dual operation namely for example the same hydraulic components can still be used with both the first and second electric motors.

The exemplary embodiments presented in this text are not to be interpreted to pose limitations to the applicability of the appended claims. The verb "to comprise" is used in this text as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
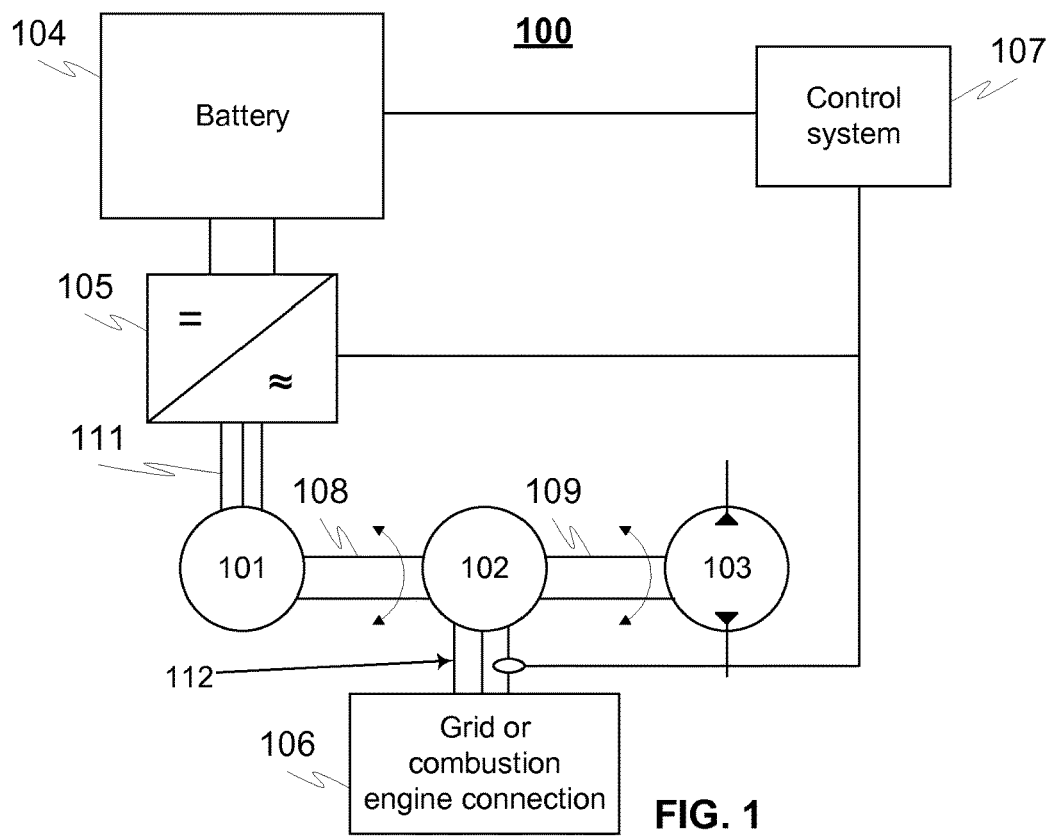
FIGS. 1-3 illustrate principles of exemplary arrangements for a dual actuated power pack according to an advantageous embodiment of the invention.
Figure 2:
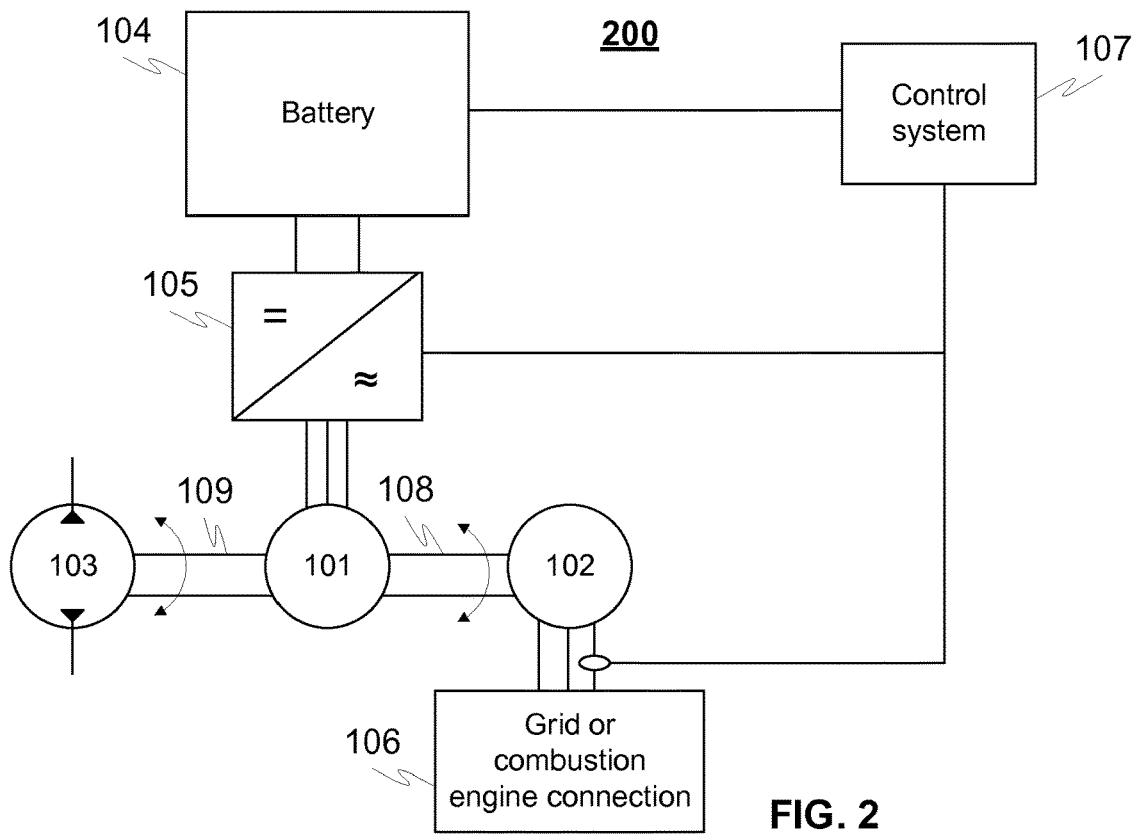
Figure 3:
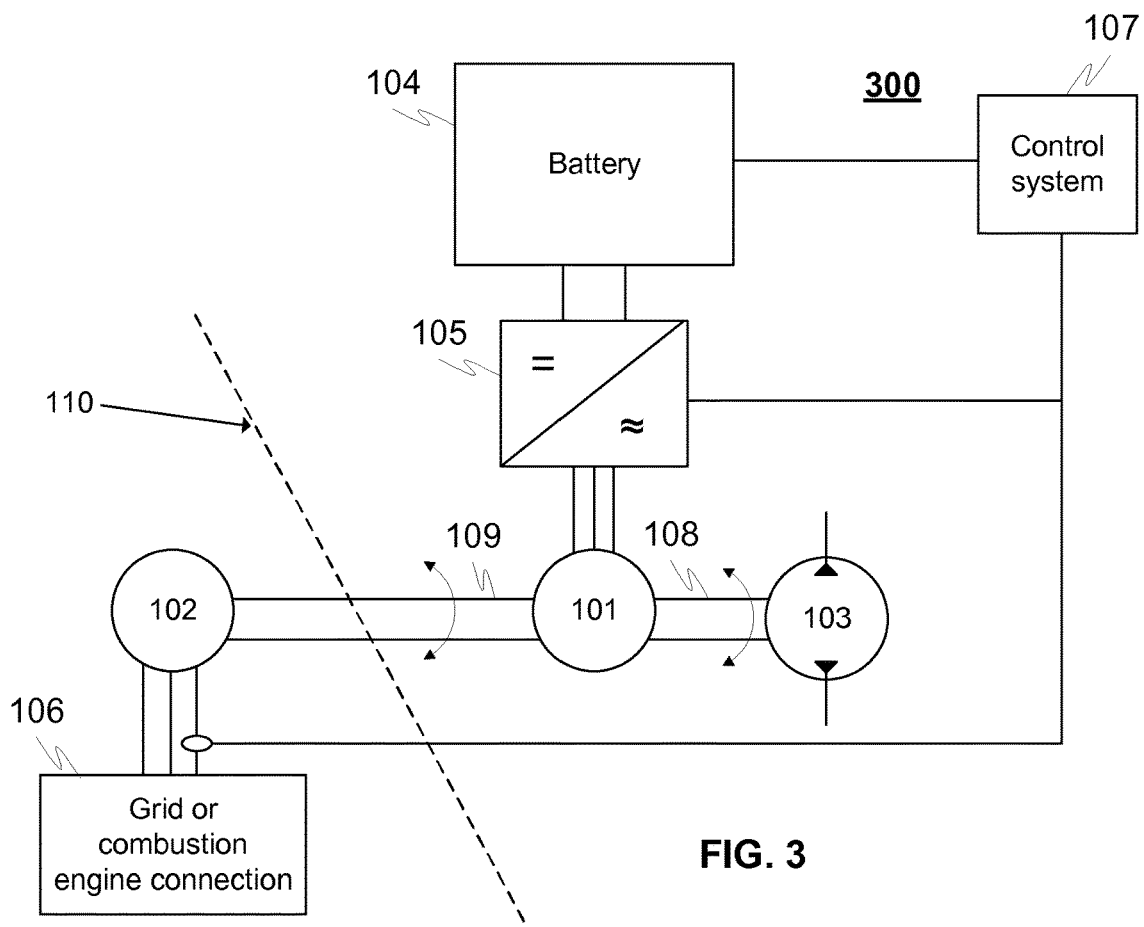

FIGS. 1-3 illustrate principles of exemplary arrangements for a dual actuated power pack according to an advantageous embodiment of the invention, where the dual actuated power pack 100, 200, 300 comprises a battery as the energy storage 104 and first 101 and second 102 electric motors. The first electric motor 101 is powered 111 by the battery energy and the second electric motor 102 is configured to be powered 112 by a grid 106 or a combustion engine. In addition the dual actuated power pack comprises a power generator 103, which is configured to be actuated by the first and second electric motors 101, 102.

The first and second electric motors 101, 102 are mechanically coupled 108 (see also FIGS. 4 and 5) with each other so that when the second electric motor 102 is powered, it actuates 109 the power generator 103, but in addition it 102 advantageously actuates at the same also the first electric motor 101. The first electric motor 101 can be implemented so that when it is actuated, so in practise rotated, it functions as a hi-power battery charger, and charges the battery 104. In situations when there is no possibility to use external energy, such as the grid or combustion engine connection 106, the first electric motor 101 is used to actuate 108 the power generator 103. The first electric motor 101 is powered by the battery energy 104.

The mechanically coupling offers a galvanic isolation 110 between the motors and thereby separates galvanically the first electric motor and the internal electrics of the dual actuated power pack 100, 200, 300 from the external grid or electrics. Thus the operation of the dual actuated power pack is in practise interference free and no interference filters are needed.

The mechanical coupling 108, 109, as well as the arranging of the motors and the power generator can be implemented numerous ways, as can be seen in Figures. The second electric motor 102 can be coupled for example at its first end 109 with the power generator 103 and at its second end 108 with the first electric motor 101, as is illustrated in FIG. 1, or the first electric motor 101 can be situated "between" the second electric motor 102 and the power generator, as is the case in FIGS. 2 and 3.

The power generator 103 may function or comprise as a converter for converting energy received from the first and second electric motors 101, 102 to movement of a medium, such as movement of an air or fluid, like oil. Most advantageously the power generator 103 is or comprises a pump, hydraulic pump or hydraulic power pack, or a compressor, air compressor or a pneumatic power pack.

According to an advantageously embodiment the first electric motor 101 can also be used for soft starting the second electric motor 102 in situation where the second electric motor 102 is used for actuating the power generator 103. This is very convenient way for example where the grid design is very weak and when the load peak induced by the starting the second electric motor for the grid during starting is high, whereupon the load peak to the grid can be essentially eliminated by the soft starting. The soft starting can be implemented e.g. by spinning the first electric motor 101 to or near synchronous grid 106 speed before connecting the second electric motor 102 to the grid 106 and thereby minimizing the payload and requirement for the grid components.

Furthermore, according to an advantageous embodiment the first electric motor 101 can be used 108, 109 in addition to moderating the power peaks also to provide additional power (providing power boost functionality) for the power generator (or to the second electric motor) during the main use of said second electric motor 102 when the power draw from the power generator 103 exceeds the capabilities or set threshold of the second electric motor 102. In this way the grid load can be kept essentially constant and additionally needs for oversizing the system or components due to possible load peaks can be minimized or even eliminated.

The second electric motor 102 is typically an induction motor and is powered by mains current 106 (grid connection). It is to be noted however that the mains current or grid connection is only an example and any type of an external electric generator 106 or any type of external electric source can be used for operating the second electric motor 102, such as a combustion engine or fuel cell. Depending on the type of the used external energy source connection parameters for the second electric motor might be adjusted, such as e.g. the operating voltage might be adjusted suitable for the second electric motor.

Additionally the dual actuated power pack may also comprise a control system 107 for controlling the operation of the motors and power generator. For example control system 107 may regulate electric current draw and loading of the second electric motor 102 and the charging or loading of the energy storage 104, such as the electric current of the battery 104. In addition the control system 107 may also control the loading of the first motor 101 e.g. by controlling the first motor 101 with a motor drive 105, as well as control the soft starting and providing the power boost functionality.

Power and other parameters of the first and second electric motors 101, 102 can naturally vary, but may be, as an example, in a range of 20-90 kW, more advantageously in a range of 30-75 kW and most advantageously about 50 KW. Naturally the powers of the first and second electric motors 101, 102 can differ from each other and also vary due to claims and demands.

Figure 4:
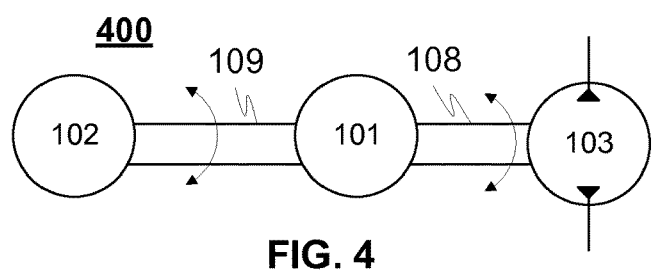
FIGS. 4-5 illustrate principles of exemplary mechanical couplings for the dual actuated power pack according to an advantageous embodiment of the invention.
Figure 5:
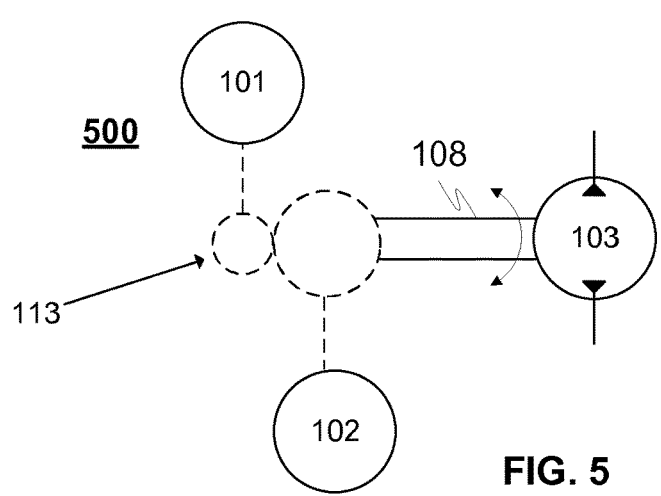

FIGS. 4-5 illustrate principles of exemplary mechanical couplings 400, 500 for the dual actuated power pack according to an advantageous embodiment of the invention, wherein in FIG. 4 a direct mechanical link from the second electric motor 102 to the power generator 103 via the first electric motor 101 is depicted. In this embodiment the mechanical coupling 108, 109 might be implemented by the direct mechanical link so that the first electrical motor is always actuated when the second electrical motor is used. It is to be noted that a clutch or free clutch or other connecting and disconnecting device can be used for mechanically disconnecting the second electric motor when the first electric motor is used so that the first electric motor is not rotating said second electric motor. In addition the mechanic coupling 108, 109 may be implemented for example by a shaft, clutch or chain or belt, but also other types of couplings known by the skilled person can be used.

The FIG. 5 illustrates another example where a geared mechanical link or a gear box 113 is used. The gears can be used e.g. to arrange the outputted speed range of the first and/or second electric motors 101, 102 with each other for different situations and/or for the optimal speed range of the power generator 103. For example hydraulic pumps have a certain optimal essentially constant RPM range for which the outputted speed range of the first and/or second electric motors 101, 102 should be adjusted.

The gears may have a constant transmission ratio, but also the gear box with number of different transmission ratios can be used for example for soft starting or other functionalities. In addition it is to be noted that the control system 107 may also control the operation of the gear box for achieving the different speed ranges for example for different loads or functions.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. For example, the battery discussed in the connection with the figures is only an example of the energy storage and the energy storage can naturally be also another type of energy storage as is disclosed elsewhere in this document. The same applies also to the type of the external energy source used for feeding energy to the second electric motor, and the external energy source can be also other type of energy source as is disclosed elsewhere in this document. Moreover the positioning of the components illustrated in figures are only examples.

The features recited in dependent claims are mutually freely combinable unless otherwise explicitly stated.

The invention claimed is:

1. A dual actuated power pack, wherein the power pack comprises:
   an energy storage,
   first and second electric motors, and
   a power generator actuated by said first and/or second electric motors, characterised in that
   said first electric motor is powered by said energy storage and said second electric motor is a grid powered electric motor, and
   said first and second electric motors are mechanically coupled with each other so that when said second electric motor is powered, said second electric motor is configured to actuate said power generator and said first electric motor, whereupon said first electric motor is configured to function as a charger or loader and recharge or reload said energy storage, and when said first electric motor is powered, said first electric motor is configured to actuate said power generator.

2. The dual actuated power pack of claim 1, wherein said first and second electric motors and said power generator are arranged so that the second electric motor is mechanically coupled at its first end with the power generator and at its second end with said first electric motor.

3. The dual actuated power pack of claim 1, wherein said mechanical coupling is implemented by a shaft, a clutch, a chain, or a belt, or said mechanical coupling comprises a gear box in order to arrange an outputted speed range of said first and/or second electric motor for a speed range of the power generator.

4. The dual actuated power pack of claim 1, wherein said power generator comprises a converter for converting energy received from said first and second electric motors to movement of a medium.

5. The dual actuated power pack of claim 4, wherein said power generator comprises one of a pump, a hydraulic pump, and a hydraulic power pack, or one of a compressor, an air compressor, and a pneumatic power pack.

6. The dual actuated power pack of claim 1, wherein said second electric motor is typically an induction motor and configured to be powered by mains current or any type of an external electric generator or any type of external electric source or by a combustion engine or fuel cell.

7. The dual actuated power pack of claim 1, wherein said first electric motor is configured to be used for soft starting the second electric motor by spinning the first electric motor to or near synchronous grid speed before connecting said second electric motor to the grid.

8. The dual actuated power pack of claim 1, wherein said first electric motor is configured to be used for moderating power peaks and/or providing additional power for the power generator during the main use of said second electric motor and when the power draw from the power generator exceeds the capabilities of the second motor.

9. The dual actuated power pack of claim 1, wherein the dual actuated power pack comprises a control system configured to regulate current draw and loading of the second electric motor and the charging or loading of the energy storage, and/or loading of said first motor by controlling said first motor with a motor drive.

10. The dual actuated power pack of claim 1, wherein said energy storage comprises an electrical energy storage, a rechargeable electric storage, a battery, a fuel cell, a supercapacitor and/or a flywheel.

11. A method for dual actuating a power pack, characterised in that the method comprises at least the following steps:
   powering a first electric motor of the power pack by an energy storage of the power pack and a second electric motor of the power pack by a grid power,
   actuating a power generator of the power pack by said first and second electric motors, and
   mechanically coupling said first and second electric motors with each other so that when said second electric motor is powered, said second electric motor actuates said power generator and said first electric motor, whereupon said first electric motor functions as a charger or loader and recharges or reloads said energy storage, and when said first electric motor is powered, said first electric motor actuates said power generator.

12. The method of claim 11, wherein the method further comprises a step of soft-starting said electric second motor by spinning the first electric motor to or near synchronous grid speed before connecting said second electric motor to the grid.

13. The method of claim 11, wherein an outputted speed range of said first and/or second electric motor is adjusted for the speed range of the power generator by said mechanical coupling.

14. The method of claim 11, wherein power peaks are moderated by using said first electric motor and/or additional power is provided for the power generator by using said first electric motor during the main use of said second electric motor.

15. The dual actuated power pack of claim 4, wherein movement of a medium comprises movement of an air or a fluid.

16. The dual actuated power pack of claim 15, wherein said fluid comprises oil.

* * * * *